(12) United States Patent
Mani

(10) Patent No.: US 6,298,998 B1
(45) Date of Patent: Oct. 9, 2001

(54) SUPPORTIVE PIN RACK FOR GREEN TIRE STORAGE

(75) Inventor: Neel K. Mani, Stow, OH (US)

(73) Assignee: Bridgestone/Firestone Inc., Akron, OH (US)

( * ) Notice: Subject to any disclaimer, the term of this patent is extended or adjusted under 35 U.S.C. 154(b) by 0 days.

(21) Appl. No.: 09/487,376

(22) Filed: Jan. 18, 2000

Related U.S. Application Data

(63) Continuation-in-part of application No. 09/110,525, filed on Jul. 6, 1998.

(51) Int. Cl.[7] .................................................. A47F 7/04
(52) U.S. Cl. .................................................... 211/23
(58) Field of Search .......................... 211/23, 24, 20, 211/21, 22, 13.1

(56) References Cited

U.S. PATENT DOCUMENTS

| | | |
|---|---|---|
| 1,311,463 | 7/1919 | Rothschild . |
| 1,391,857 | 9/1921 | Schmitt . |
| 1,476,581 | 12/1923 | Baxter et al. . |
| 1,718,828 | 6/1929 | Murphy . |
| 3,335,871 | 8/1967 | Crisman ................................. 211/24 |
| 3,547,258 | 12/1970 | Black ..................................... 206/65 |
| 3,700,113 | 10/1972 | Hager ..................................... 211/23 |
| 3,759,394 | 9/1973 | Hottle ..................................... 211/23 |
| 3,812,974 | 5/1974 | Sylvester ................................ 221/23 |
| 3,935,948 | 2/1976 | Podojil ................................... 211/23 |
| 4,153,497 | 5/1979 | Budrioli ................................ 156/394 |
| 4,573,587 | 3/1986 | Matthews, Jr. ......................... 211/24 |

FOREIGN PATENT DOCUMENTS 686208    1/1953   (GB) .

Primary Examiner—Alvin Chin-Shue
Assistant Examiner—Sarah Purol
(74) Attorney, Agent, or Firm—Thomas R. Kingsbury; Michael Sand; John H. Hornickel

(57) ABSTRACT

A supportive tire rack for green tire transfer and storage includes a base assembly that carries at least four support pins that are horizontally cantilevered from the base. A pair of upper support plates and a pair of lower support plates are carried by the pins. The upper support plates engage the bead rings of the tire while the lower support plates cradle the lower surface of the tire. Each support plate is pivotally carried on an arm that is pivotally carried on a pin. Each arm is also in the form of a damper that dampens oscillatory forces in the tire. The arms and plates are biased toward resting positions by springs. Alternatively, the lower support is a spring biased sling formed of a flexible material and the upper support is a pair of spring biased T-shaped arms which are pivotally mounted on two of the pins for engaging the bead rings.

19 Claims, 10 Drawing Sheets

SUPPORTIVE PIN RACK FOR GREEN TIRE STORAGE

CROSS REFERENCE TO RELATED APPLICATION

This application is a continuation-in-part of pending application Ser. No. 09/110,525, filed Jul. 6, 1998.

BACKGROUND OF THE INVENTION

1. Technical Field

The present invention relates generally to tire racks and, more particularly to tire racks that are used to store and transport unvulcanized or "green" tires. Specifically, the present invention relates to a green tire rack that supports the upper and lower portions of each green tire with pairs of arcuate plates that are, in turn, supported on dampers that dampen potentially damaging oscillation forces or by a pair of pivotally mounted arms and a flexible lower spring biased sling.

2. Background Information

There is a need during the tire manufacturing process to store and transport green tires before they are cured. The racks that are currently used in the art allow the green tires to be automatically transferred to the storage rack from the tire assembly machines. One type of known green tire rack simply employs a pair of horizontal, parallel, side-by-side pins that are configured to fit within the interior of the tire and engage the bead rings such that the green tire rests on the two pins. The pins are long enough to allow up to three green tires to be received next to each other on the pins. The pins are spaced apart so that an automated transfer mechanism can pass between the pins to place the green tires on the rack.

One problem with this known rack is that the tires hanging on the pins are only supported by the point contacts between the bead rings and the pins. Further, the pin rack does not support the green tire from below. The green tires thus tend to sag under their own weight causing the bead rings and the tire to deform. Such deformity leads to nonuniform tires. It is thus desired in the art to provide a green tire rack that supports the green tires in a manner that prevents the green tires from sagging under their own weight.

The green tires are typically transported from one location in the tire assembly plant to another location where the green tires are cured. The transfer frequently occurs with the tires on the pin racks. It is desired to move the pin racks from one location in the plant to the other location as fast as possible to increase the speed the tire manufacturing process. The racks are thus transported through the plant at relatively high speeds with the green tires experiencing various forces as the tire racks hit bumps, speed up, and slow down along the way. These forces cause oscillations to occur in the green tires that can lead to nonuniform cured tires. It is thus desired in the art to provide a green tire rack that prevents such oscillations by dampening the forces experienced by the green tires.

One supporting device capable of supporting green tires that does not employ the two spaced pins discussed above is disclosed in U.S. Pat. No. 3,759,394. The supporting device disclosed in this patent includes a pair of opposed end pieces and a cross bar with one of the end pieces being fixed with respect to the cross bar and the other of the end pieces slidably disposed on the cross bar. The end pieces are interconnected by a plurality of deformable resilient support members that flex outwardly when the one end piece is moved towards the other end piece along the cross bar. The supporting device is used by pulling the end pieces away from each other and inserting the device in the middle of a green tire. The movable end piece is then pushed toward the other end piece causing the resilient members to flex outwardly and fill the interior of the green tire between the tire sidewalls and the tire tread. The movable end piece is then locked in place to maintain the position and configuration of the support device.

U.S. Pat. No. 3,812,974 discloses another green tire support device. The device disclosed in this patent includes a frame that supports a plurality of flexible slings that each carries a green tire. One portion the support frame that carries the sling is capable of pivoting downwardly so that the green tire may be rolled from the rack onto the floor. Although this rack provides a device that supports the tire over a substantial portion of its lower surface area, the rack does not disclose any means for supporting the tires from within and does not disclose a rack that dampens oscillatory forces.

U.S. Pat. No. 3,935,948 discloses a portable storage rack for unvulcanized pneumatic tires. The storage rack includes a plurality of prongs that extend from a base. Each prong carries a curved cradle designed to fit within a green tire between the tire sidewalls. The patent does not disclose a device that supports the tires from below to prevent sagging or one that dampens oscillatory forces.

In view of the foregoing, it is desired in the art to provide a portable storage rack for green tires capable of supporting multiple tires in a manner that prevents each tire from sagging by supporting the tire at an upper bead area and bottom tread area while also providing dampeners that minimize harmful oscillatory forces.

SUMMARY OF THE INVENTION

It is an objective of the present invention to provide a supportive pin rack for green tire storage that cradles each tire from below and from the interior of the tire at the bead area.

Another objective of the present invention is to provide a supportive pin rack for green tire storage that supports each tire along the length of the bead and a length of the lower surface of the tire so as to minimize tire distortion caused by sagging by spreading the supportive forces out over a large area.

Yet another objective of the present invention is to provide a supportive pin rack for green tire storage that includes dampers that prevent or minimize tire oscillation when the tire rack is transported through the plant at relatively high speeds.

Still another objective of the present invention is to provide a supportive pin rack for green tire storage that can be easily retrofit on existing pin racks.

A further objective of the present invention is to provide a supportive pin rack for green tire storage that is compatible with existing tire assembly machines such that the existing machinery does not have to be modified in any way in order to work with the improved supportive green tire rack.

Yet a further objective of the present invention is to provide a supportive pin rack for green tire storage that substantially increases the contact area between the green tire and the tire rack so that the tire experiences less stress while being held by the rack.

Still a further objective of the present invention is to provide a supportive pin rack for green tire storage that decreases contact stresses between the rack and the tire.

An additional objective of the present invention is to provide a supportive pin rack for green tire storage that requires little, if any, maintenance.

Yet an additional objective of the present invention is to provide a supportive pin rack for green tire storage that can accommodate tires of several sizes within a certain range without modifying the rack.

Another objective of the present invention is to provide a supportive pin rack for green tire storage that individually supports each tire at two spaced locations.

A further objective of the present invention is to provide a supportive pin rack for green tire storage that is of simple construction, which achieves the stated objectives in a simple, effective, and inexpensive manner, in which solves the problems and which satisfies the needs existing in the art.

These and other objectives and advantages are obtained by the tire rack for green tires, each green tire having a pair of spaced beads and an outer surface, the tire rack including a base; an upper support carried by a base, the upper support adapted to engage the beads; and a lower support carried by a base, the lower support adapted to support the tire from below by engaging the outer surface.

BRIEF DESCRIPTION OF THE DRAWINGS

The preferred embodiment of the invention, illustrative of the best mode in which applicant contemplated applying the principles, is set forth in the following description and is shown in the drawings and is particularly and distinctly pointed out and set forth in the appended claims.

Similar numbers refer to similar elements throughout the specification.

DESCRIPTION OF THE PREFERRED EMBODIMENTS

Figure 1:
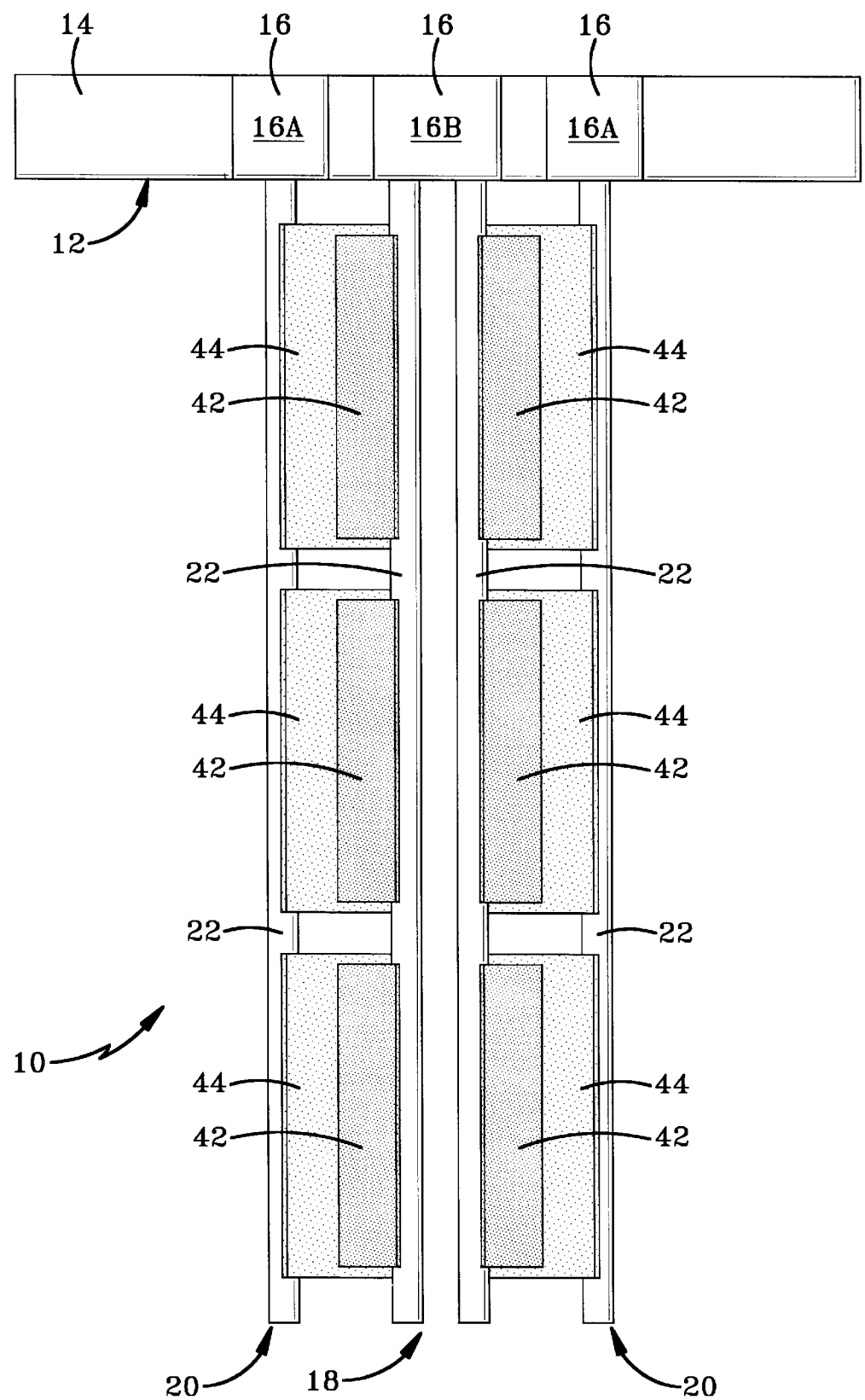
FIG. 1 is a top plan view of the supportive pin rack for green tire storage according to the present invention depicted without tires.

The improved supportive pin rack for green tire storage is depicted in the accompanying drawings and is indicated generally by the numeral 10. Pin rack 10 generally includes a base assembly 12 that includes a floor member 14 that is disposed substantially horizontal to the floor and may be supported on the floor by a plurality of wheels so that pin rack 10 may be moved from place to place on the wheels. Base assembly 12 further includes a plurality of pillars 16 that extend vertically upward from floor member 14. Each of the members of base assembly 12 may be fabricated from an appropriate metal or an appropriate plastic and connected by known connectors such as welds or nut and bolt assemblies. Floor member 14 is only schematically depicted in the drawings. In practice, floor member 14 is configured to provide the appropriate support to tire rack 10 to prevent tire rack 10 from overturning when it is fully loaded.

Figure 2:
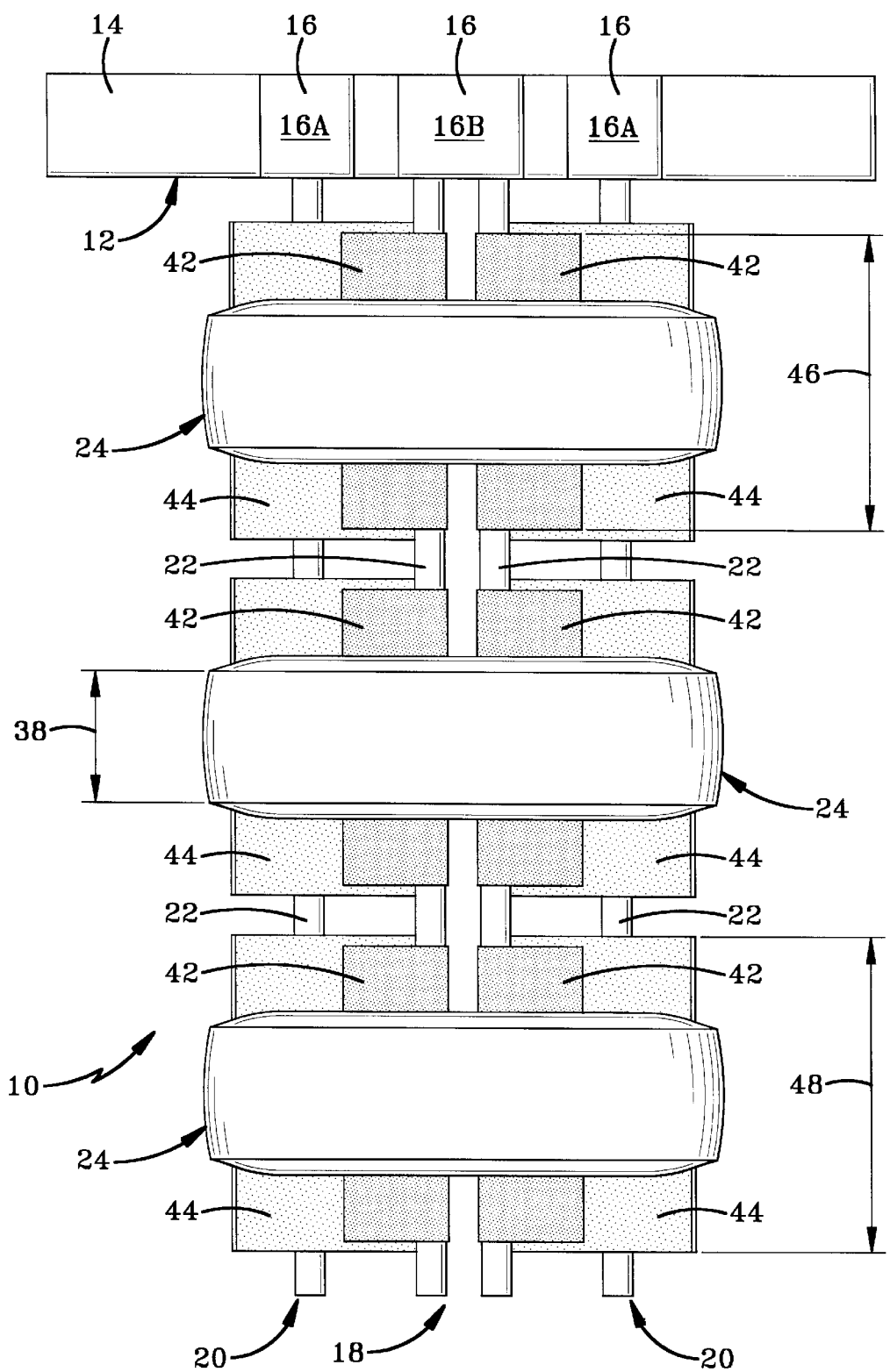
FIG. 2 is a top plan view of the pin rack of FIG. 1 with three tires loaded on the rack.

Supportive pin rack 10 includes at least one upper pin set 18 and at least one lower pin set 20. Each pin set 18 and 20 is cantilevered from pillars 16. In the embodiment of the invention depicted in the drawings, three pillars 16 extend upwardly from floor member 14 of base assembly 12. A central pillar 16B carries upper pin set 18 while a pair of outer pillars 16A carry lower pin set 20. Each pin set 18 and 20 includes a pair of spaced, substantially horizontal, and substantially parallel pins 22. Each pin 22 extends far enough from each pillar 16 to hold up to three tires 24 as depicted in FIG. 2. Each pin 22 is fabricated from a material such as metal or a synthetic that is capable of supporting the weight of up to three tires 24 when cantilevered from pillars 16. In the embodiment of the invention depicted in the drawings, each pin 22 is in the form of a solid or hollow metal tube that is cantilevered from pillar 16 in a manner that prevents pins 22 from bending or deflecting. Pins 22 may be welded to pillar 16 or may be anchored into pillar 16 and then bolted in place. Pins 22 may also be in other forms in different embodiments of the present invention and may be connected to pillar 16 in other manners. For instance, each pin 22 may have a rectangular cross section or may be in the form of an I-beam.

Upper pin set 18 is configured to fit within the center opening 26 of tire 24. Pins 22 of upper pin set 18 are also spaced apart a distance sufficient to allow an automated transfer machine to place a tire on supportive pin rack 10 without engaging or damaging supportive pin rack 10. It is desired that pins 22 of upper pin set 18 be spaced apart substantially the same distance as the pins of the prior art racks such that pin rack 10 may be created by retrofitting the prior art devices. The automated transfer machines have been used in the past with prior art pin racks that simply included a pair of spaced pins similar to upper pin set 18. Thus, upper pin set 18 of pin rack 10 allows pin rack 10 to function with the existing transfer machines. Further, the pins 22 of lower pin set 20 are spaced far enough apart so as to not interfere with the transfer machines.

Lower pin set 20 is positioned below tire 24 when tire 24 is carried by pin rack 10. Pins 22 of lower pin set 20 are spaced apart farther than pins 22 of upper pin set 18. While pins 22 of upper pin set 18 are positioned inside the inner diameter 28 of tire 24, pins 22 of lower pin set 20 are positioned outside inner diameter 28 of tire 24 but inside the outer diameter 30 of tire 24.

Each tire 24 includes a pair of bead rings 32 disposed about inner diameter 28. The tire sidewalls 34 extend radially outwardly from bead rings 32 and terminate in the outer surface 36 that lies along outer diameter 30 of tire 24. Outer surface 36 has a width indicated by the dimension line labeled by the numeral 38.

Upper pin set 18 carries a pair of upper support plates 42 and lower pin set 20 carries a pair of lower support plates 44. Each support plate 42 and 44 is arcuate and includes an upwardly facing support surface. As shown in FIGS. 1 and 2, each upper support plate 42 has a width, indicated generally by the dimension line labeled with the numeral 46, that is greater than width 38 of tire outer surface 36. Further, each lower support plate 44 has a width, indicated generally by the dimension line labeled by the numeral 48, that is greater than width 38 of outer surface 36. As such, when tire 24 is supported by support plates 42 and 44, support plates 42 and 44 extend entirely across the width of tire 24 as depicted in FIG. 2. The extra width of plates 42 and 44 that extends out from either side of tire 24 allows for some error when the automated machinery is placing tire 24 on pin rack 10. The width also allows pin rack 10 to accommodate tires 24 of varying sizes.

Figure 3:
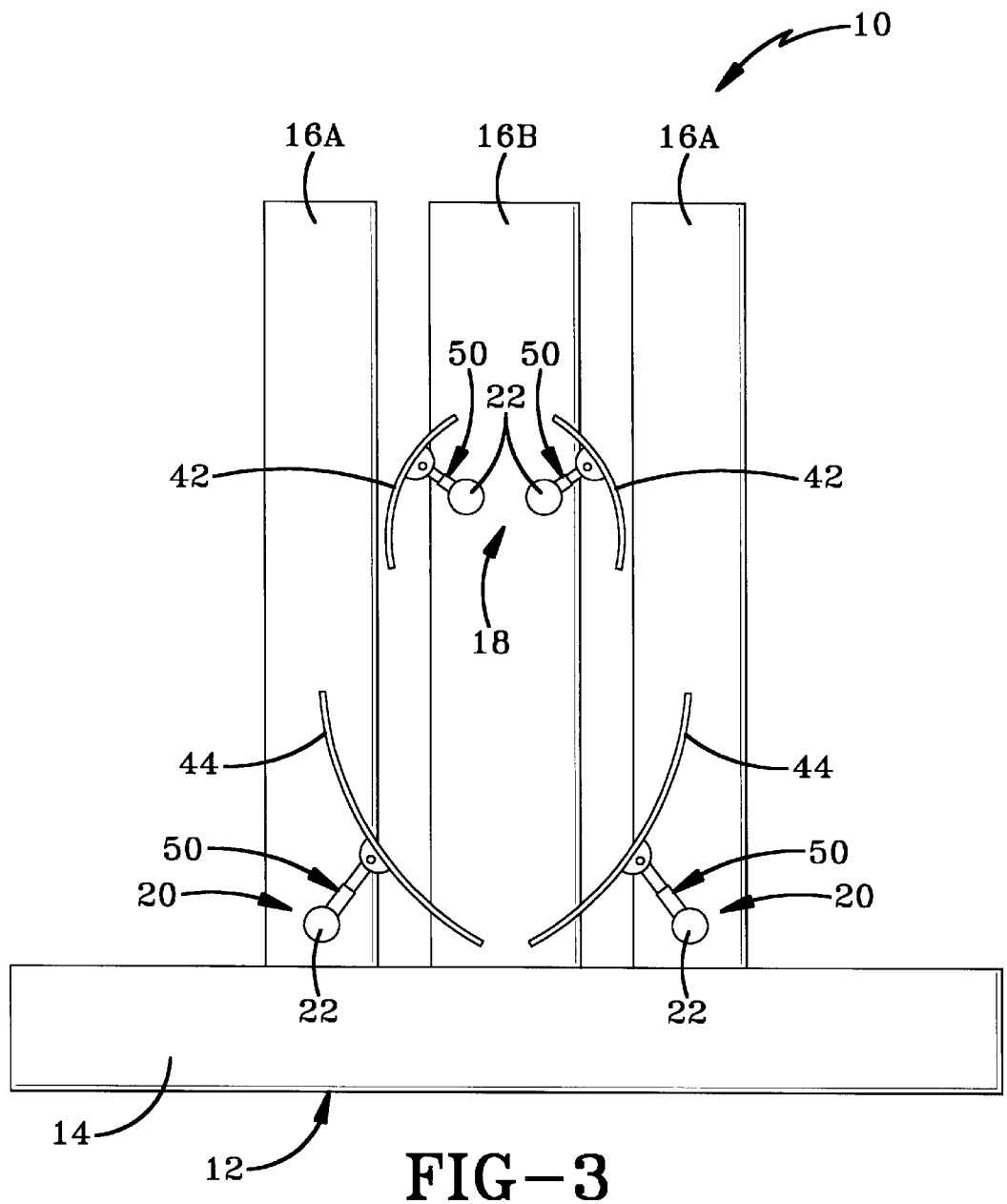
FIG. 3 is a front view of the empty pin rack of FIG. 1.
Figure 4:
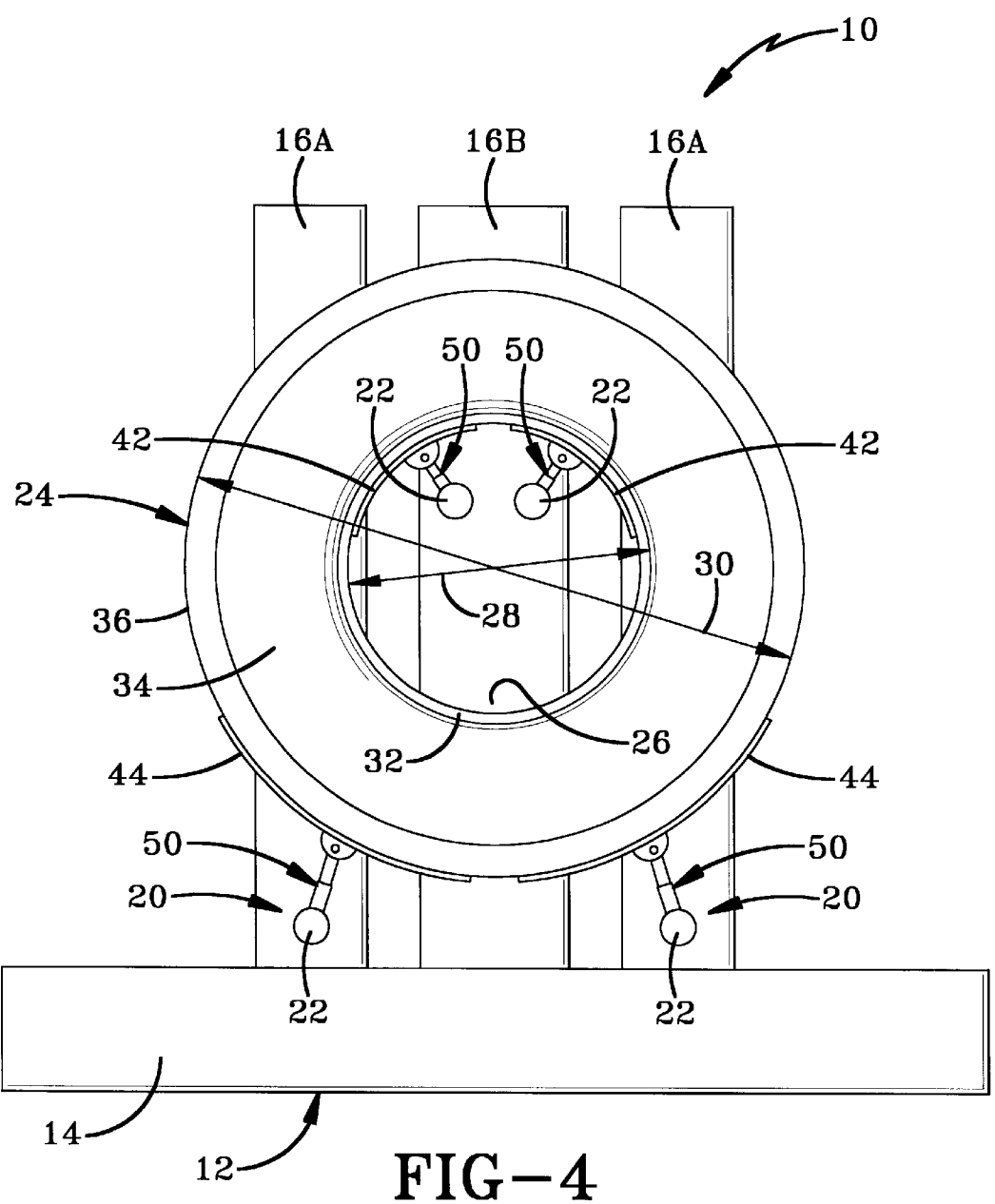
FIG. 4 is a front view similar to FIG. 3 with tires loaded on the rack.

As may be seen in FIG. 3, the curve of the support surface of each upper support plate 42 is convex while the curve of the support surface of each lower support plate 44 is concave. Upper support plates 42 are curved along inner diameter 28 such that substantially the entire length of each upper plate 42 is in contact with both bead rings 32 when tire 24 is supported on pin rack 10 as depicted in FIG. 4. Similarly, each lower support plate 44 has a curvature that is substantially similar to outer diameter 30 of tire 24. Such curvature ensures that there is contact between outer surface 36 and lower support plate 44 along substantially the entire length of each lower support plate 44. In accordance with another objective of the present invention, the supporting force between plates 42 and 44 and tire 24 is spread over a large area of tire 24 to prevent pinpoint stresses from occurring within tire 24 at the support points. The location of plates 42 and 44 also prevents tire 24 from sagging because tire 24 is supported from below by lower support plates 44 and at its upper portion by upper support plates 42. The arcuate nature of support plates 42 and 44 also tend to maintain the desired shape of tire 24 during storage and transportation.

The curvature and length of each support plate 42 and 44 is varied when pin rack 10 is used with significantly different sized tires. However, in accordance with one of the objectives of the invention, pin rack 10 is capable of supporting different sized tires because each support plate 42 and 44 is movably mounted with respect to pins 22.

Figure 6:
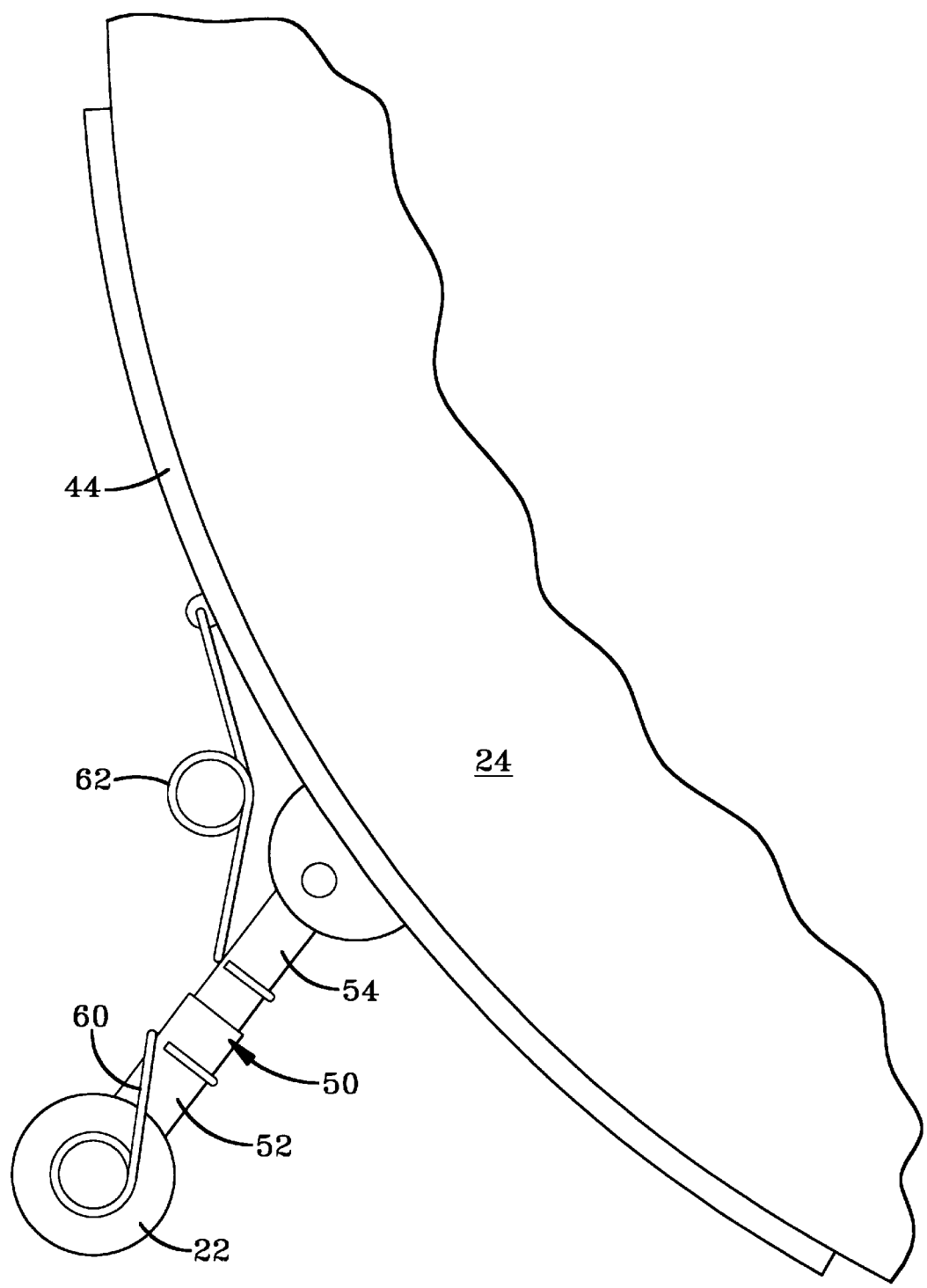
FIG. 6 is detailed front view of one of the arcuate support plates and the mechanism that adjustably supports the support plate from the pin.
Figure 7:
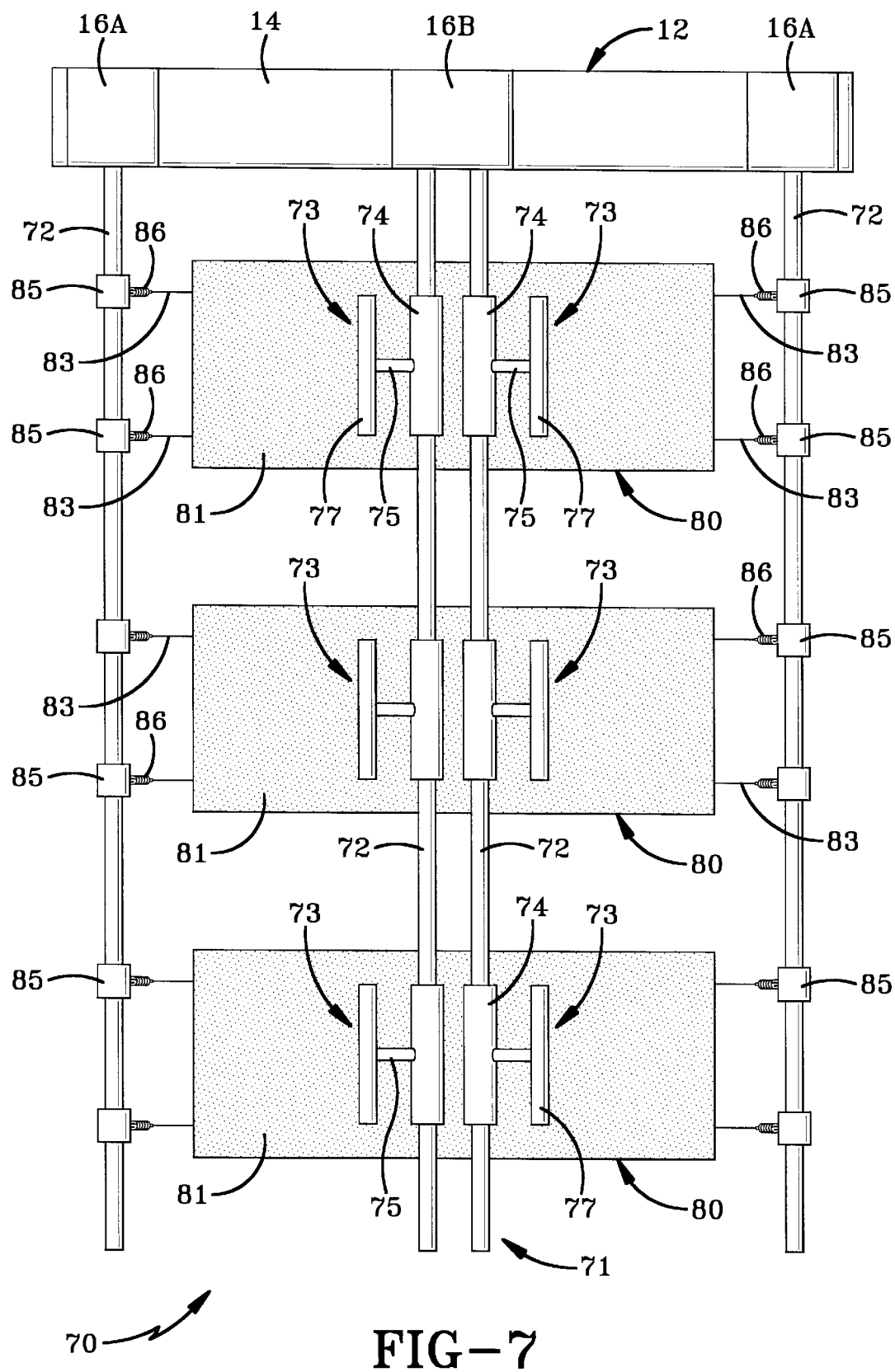
FIG. 7 is a top plan view similar to FIG. 1 of a modified pin rack construction.
Figure 8:
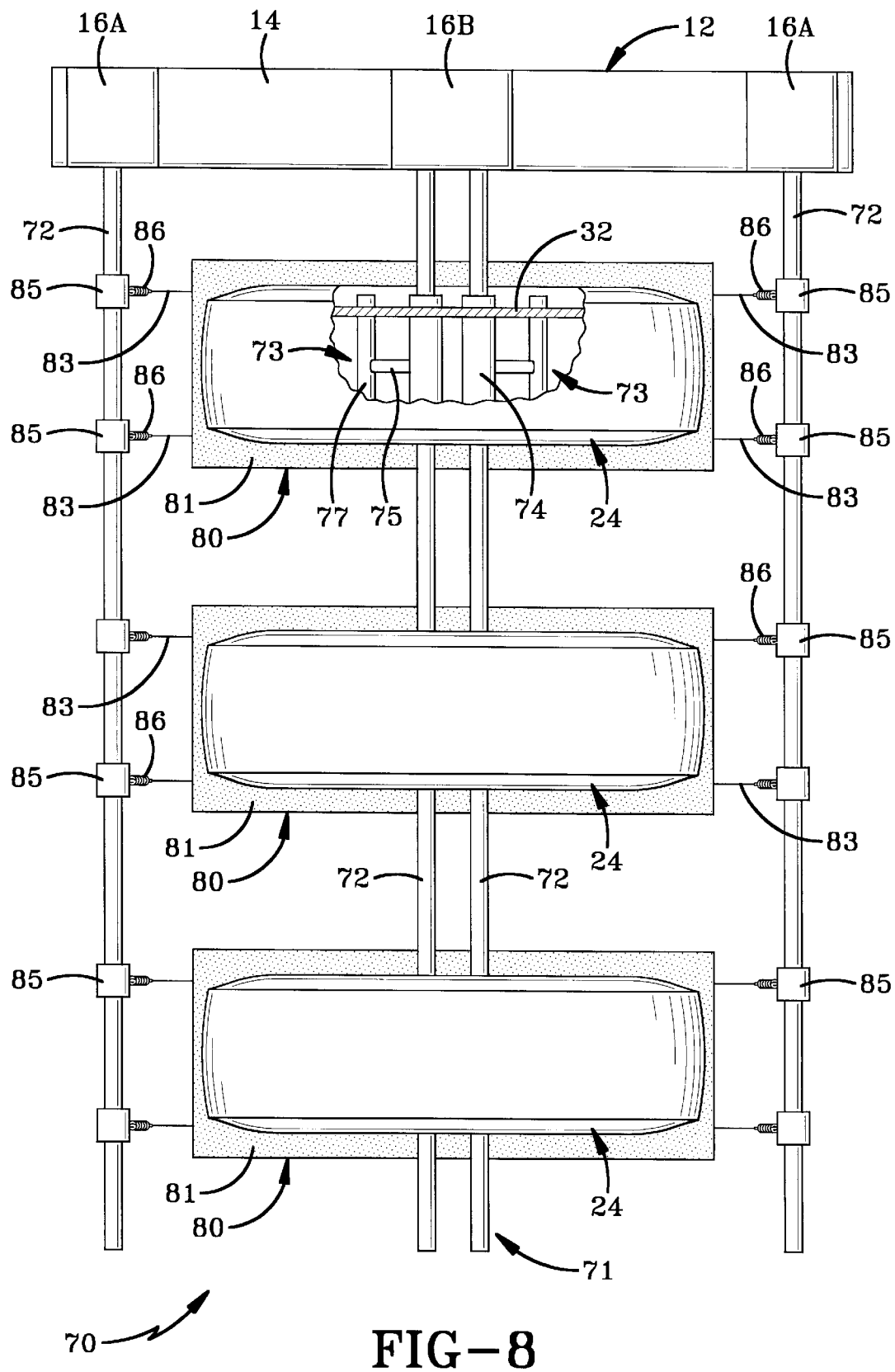
FIG. 8 is a top plan view similar to FIG. 7 of the modified rack construction with tires loaded thereon.
Figure 9:
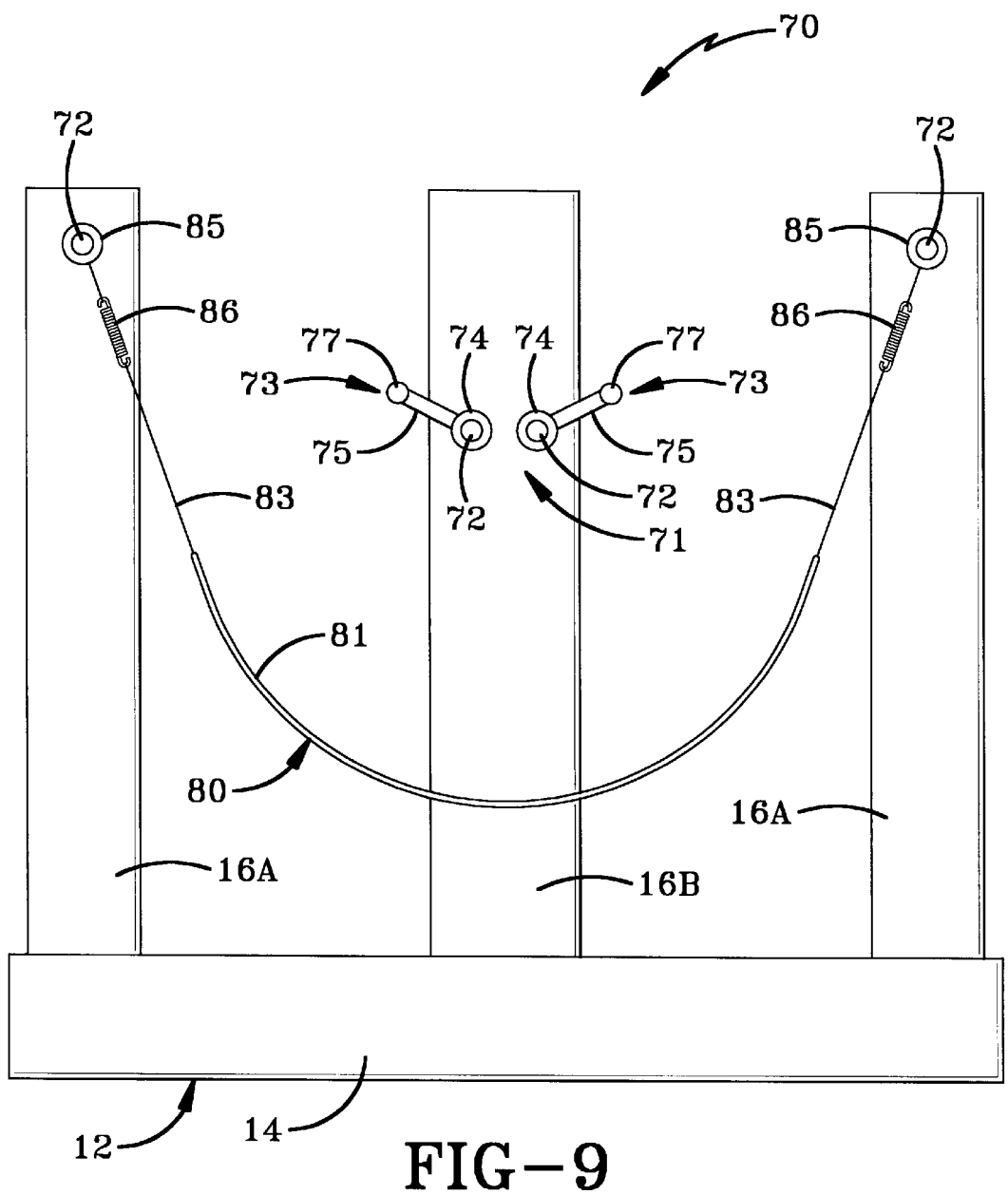
FIG. 9 is a front elevational view similar to FIG. 3 of the modified pin rack construction.

Each support plate 42 and 44 is movably mounted on a pin 22 such that support plate 42 or 44 may rotate about pin 22 on a pivot. Each support plate 42 and 44 is connected to a pin 22 by an arm 50. One detailed view of arm 50 is shown in FIG. 6 to provide an example. Each arm 50 is pivotally connected to a pin 22 with arcuate plates 42 and 44 being pivotally connected to arms 50. Each support plate 42 and 44 may thus pivot with respect to its supporting arm 50 and pivot with respect to its supporting pin 22 as well as being able to rotate about its supporting pin 22 on its supporting arm 50. Such freedom of movement allows each support plate 42 and 44 to move into a desirable support position as tire 24 is placed in pin rack 10 by a transfer machine. Plates 42 and 44 automatically adjust to the size of tire 24 as long as tire 24 is within a certain range of sizes. The automatic adjustment eliminates the time-consuming step of manually adjusting each pin rack 10 for slightly different tire sizes and allows pin racks 10 to be used on a variety of tire manufacturing lines without adjustment.

In accordance with another objective of the present invention, each arm 50 may be in the form of a damper that dampens damaging forces experienced by pin rack 10 that tend to create oscillations in tire 24. In one embodiment of the present invention, each arm 50 is in the form of a shock absorber-type damper that has an outer sleeve 52 disposed over an inner sleeve 54 with a spring and friction-creating member disposed between the inner 54 and outer 52 members. This type of device functions to dampen forces that may otherwise create damaging oscillations in tire 24. In other embodiments of the invention, a different type of damper may be used without departing from the concepts of the present invention. Although each arm 50 is configured to somewhat give in order to allow support plates 42 and 44 to automatically adjust to tire 24 as discussed above, each damper 42 and 44 evenly supports the weight of tire 24. This arrangement allows the weight of tire 24 to be evenly distributed over upper support plates 42 and lower support plates 44.

Each arm 50 and support plate 42 and 44 is biased by first springs 60 and second springs 62. Springs 60 and 62 urge arms 50 and support plates 42 and 44 to resting positions where tires 24 may be easily loaded onto tire rack 10. Specifically, first springs 60 extend between arms 50 and pins 22. First springs 60 urge arms 50 that carry lower support plates 44 inwardly toward their resting positions while urging arms 50 that carry upper support plates 42 outwardly toward their resting positions. Second springs 62 extend between arms 50 and support plates 42 and 44. Second springs 62 urge support plates 42 and 44 inwardly toward their resting positions.

The word "inwardly" is intended to mean that arms 50 are being urged toward each other in the arrangement depicted in FIGS. 3 and 4. The word "outwardly" is thus intended to mean that arms 50 are urged or biased away from each other. The inward biasing by springs 60 of lower support plates and the outward urging by springs 60 of upper support plates forces support plates 42 and 44 against tire 24 to obtain a stable support position. For instance, arm 50 depicted in FIG. 6 moves inwardly when it rotates in the clockwise direction thus forcing plate 44 into tire 24.

In the embodiment of the invention depicted in the drawings, each spring 60 and 62 is in the form of a coil spring. In other embodiments of the present invention, other devices may be employed to bias arms 50 and support plates 42 and 44 in the desired directions. Pin rack 10 may also include stops that limit the pivotal movement of support plates 42 and 44 and of arms 50 such that arms 50 and support plates 42 and 44 stop rotating once they reach the resting position.

Arms 50 and springs 60 and 62 achieve one of the objectives of the present invention by allowing pin rack 10 to accommodate tires 24 having different inner diameters 28 and different outer diameters 30. Such accommodation occurs because the distance between pins 22 and support plates 42 and 44 is adjustable by arms 50 and the location and angle of support plates 42 and 44 with respect to pins 22 is automatically adjusted by springs 60 and 62.

Figure 5:
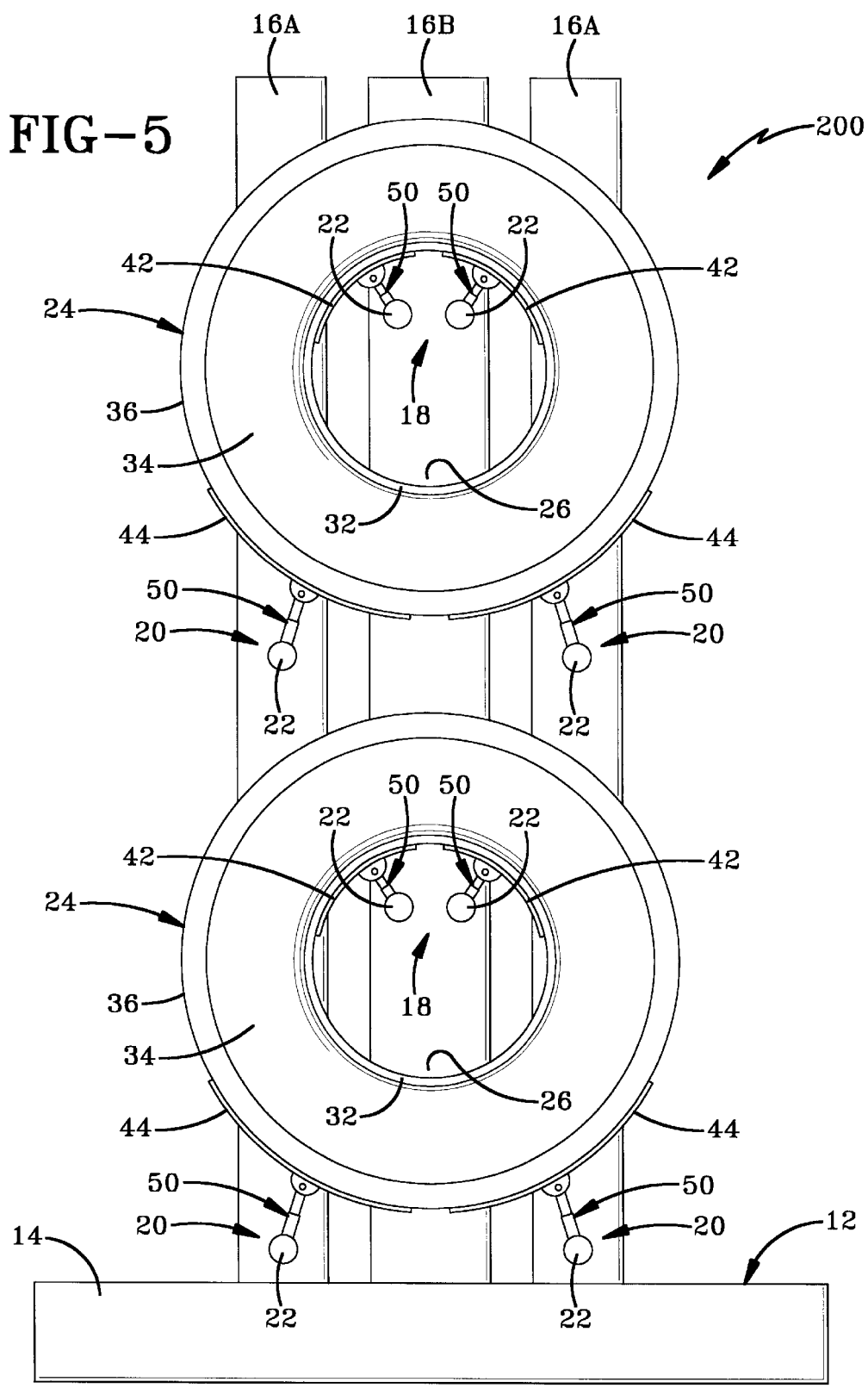
FIG. 5 is a front view of a tire rack according to the present invention with one rack of tires disposed above another.

Pin rack 10 may be configured to hold a single tire 24, three tires 24 as depicted in FIG. 1, or six tires as depicted in FIG. 5. Other arrangements of pins 22 and support plates 42 and 44 are also contemplated that may support even more tires 24 on a single base assembly 12. In the embodiment depicted in FIG. 5, six tires 24 are carried by pin rack 10. Three tires 24 are carried on first sets 18 and 20 of pins 22 while another three tires 24 are carried on second sets 18 and 20 of pins 22. First and second sets 18 and 20 are substantially vertically disposed with respect to each other such that tires 24 of equal sizes are vertically dispose when carried on pin rack 10. The present invention also contemplates that other tire rack configurations may be created utilizing the concepts of the present invention. For example, pin sets 18 and 20 may extend from both sides of pillars 16. Furthermore, multiple sets of pillars 16 may be carried by a single floor member 14.

Pin rack 10 is in a resting position when it does not carry any tires and springs 60 and 62 have urged arms 50 and plates 42 and 44 to their respective resting positions as depicted in FIG. 3. In this position, upper support plates 42 are disposed to fit within central opening 26 of tire 24 and lower support plates 44 are positioned to be engaged and forced outwardly by the lower portion of outer surface 36 of tire 24. As discussed above, pins 22 and support plates 42 and 44 are positioned to not interfere with an automated transfer machine that transfers green tires 24 from an assembly line to pin rack 10.

Green tires 24 are lifted onto pin rack 10 such that inner opening of tire 26 is moved over upper support plates 42 and the lower portion of outer tire surface 36 is positioned above lower support plates 44. The transfer machine then lowers tire 24 into engagement with support plates 42 and 44. Arms 50 initially give to allow support plates 42 and 44 to accommodate tire 24. Arms 50 also pivot about pins 22 to correctly position support plates 42 and 44 to positions where the weight of tire 24 is evenly distributed. Arms 50 and support plates 42 and 44 have thus moved from their resting positions to their support positions depicted in FIG. 4. Tire 24 is thus securely supported by pin rack 10 without point stresses and in a manner that dampens oscillatory forces. The transfer machine then backs out of pin rack 10 to obtain another tire 24.

A second embodiment of the improved supportive pin rack is indicated generally at 70, and is shown in FIGS. 7–11. Pin rack 70 includes the same base assembly 12 and pillars 16 as that described above with respect to the embodiment of FIGS. 1–6 and therefore is not described in further detail. Pin rack 70 includes an upper pin set indicated generally at 71, which includes a pair of pins 72 which extend in a cantilever manner outwardly at generally right angles from the center pillar. An arm indicated generally at 73 is pivotally mounted on each pin 72, two arms per tire, by an enlarged cylindrical collar 74. Each arm 73 preferably is T-shaped having a base bar 75 connected to collar 74 and extending outwardly from and normal to collar 74. Base bar 75 terminates in a cross bar 77 which extends normal thereto. Arms 73 are biased in an upward direction as shown by arrows A in FIG. 11 by torsional springs 78 which are wrapped about and extend between fixed pins 72 and either collar 74 or arm 73. Other types of biasing devices may be used without affecting the invention.

Figure 10:
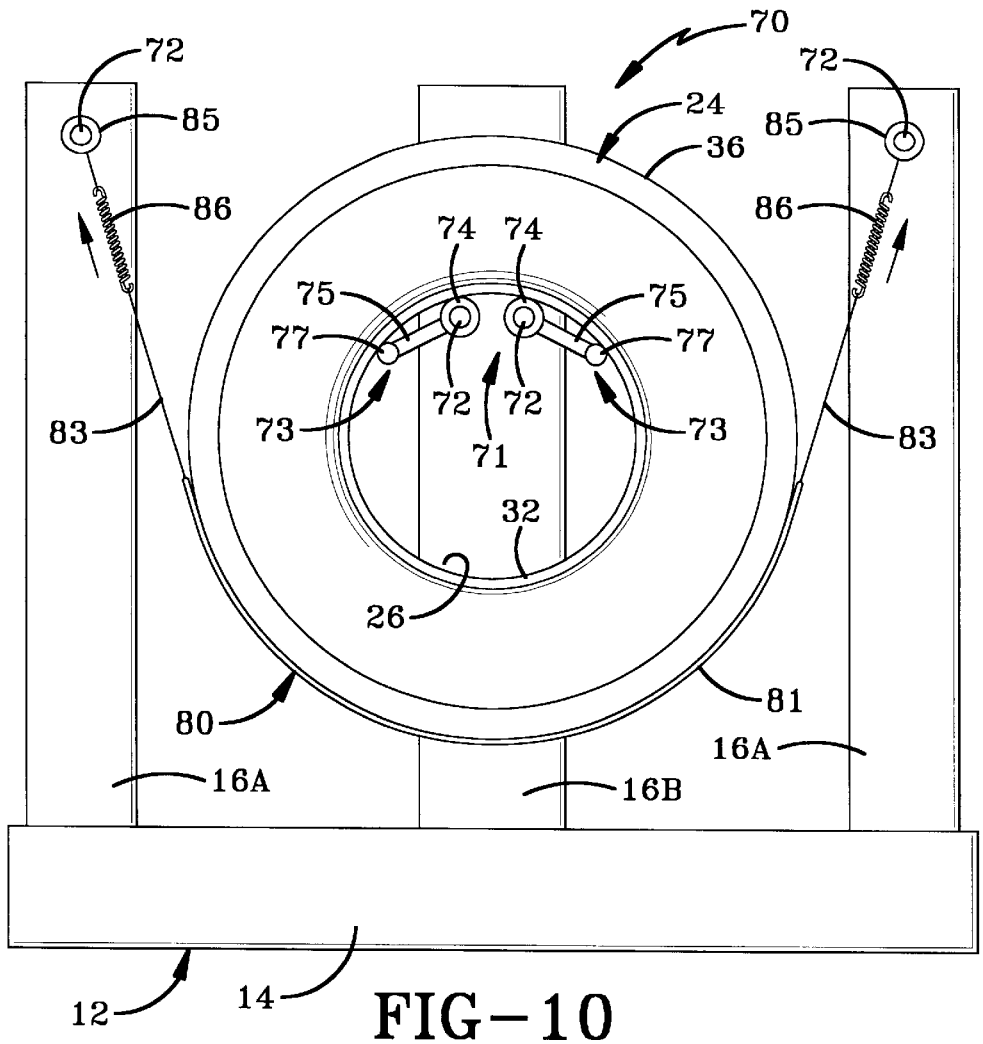
FIG. 10 is a front view similar to FIG. 9 with a tire loaded on the rack.
Figure 11:
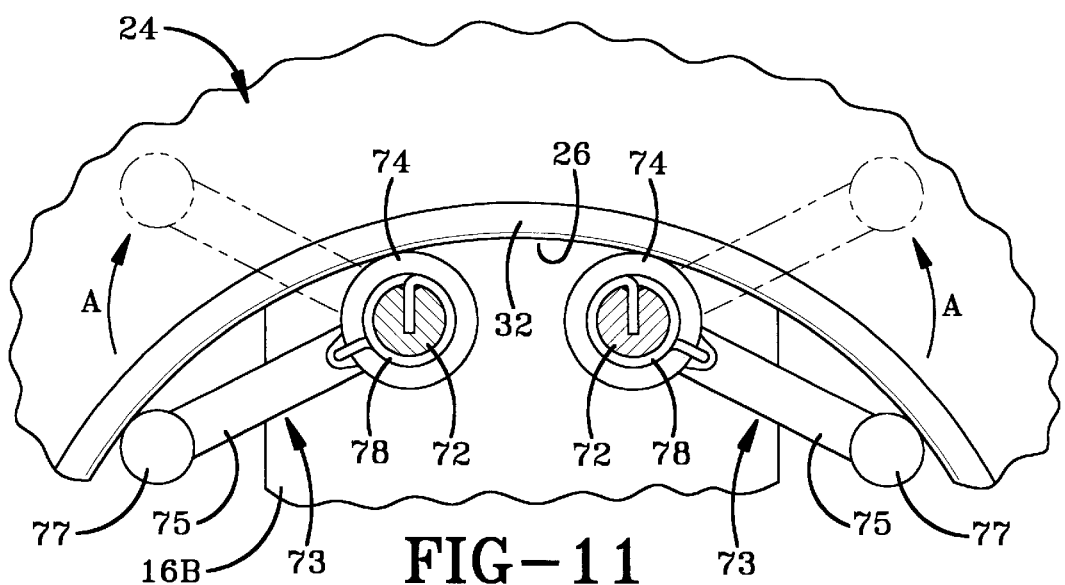
FIG. 11 is an enlarged fragmentary view with portions in section showing the spring biasing of the bead engaging arms.

A sling indicated generally at 80, is mounted below each of the pin sets 71. Sling 80 includes a strip 81 of flexible material, such as leather or canvas, which has a width sufficient to support the outer surface 36 of all tires that will be used with rack 70. Sling 80 includes two pairs of cables 83 which extend between fabric strip 81 and the two outer pillars 16A and are connected thereto by fasteners 85. Preferably a coil spring 86 or other biasing device, acts upon each of the cables to bias sling 80 in an upward direction. As shown in FIGS. 10 and 11, when a green tire 24 is placed on rack 70, pins 72 and arms 73 will extend into central opening 26 of the tire. Tire bead rings 32 will be supported at two spaced locations on collars 74 and at two other spaced locations on cross bars 77 of arms 73 which are biased by springs 78 into supporting engagement with the bead rings. Simultaneously with supporting tire 24 at four spaced locations by the upper support, the tire is supported on sling 80 by cables 83, springs 86 and fabric 81 which provide a sufficient uplifting or supporting force on the lower portion of the tire to prevent sagging and distortion as occurs with prior green tire storage racks which support the tire at only upper or lower portions.

Thus, when tire 24 is loaded on rack 70, collars 74 allow arms 73 to rotate with respect to pins 71, while the cylindrical collars remain in contact with the tire bead, to ensure that irrespective of the tire size the beads will be supported at four points, two by collars 74 and two by cylindrical cross bars 77. The flexibility of strip 81 of sling 80 will enable the sling to conform to the outer circumference of the tire to accommodate different tire sizes with springs 86 maintaining proper cable tension to ensure proper support for the bottom of the tire. The length of the cables and the stiffness of springs 86 are selected based upon the range of tire sizes that will be stored on the rack to provide the correct amount of support for the lower portion of the tire to equally distribute the tire weight over sling 80 and the upper contact points provided by collars 74 and cross bars 77, to prevent the weight of the tire from distorting its toroidal shape.

Accordingly, the improved supportive pin rack for green tire storage apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the supportive pin rack for green tire storage is constructed and used, the characteristics of the construction, and the advantageous new and useful results obtained; the new and useful structures, devices, elements, arrangements, parts, and combinations are set forth in the appended claims.

What is claimed is:

1. A tire rack for green tires, each green tire having a pair of spaced beads defining a central opening and an outer surface, said tire rack comprising:
    a base;
    an upper support member carried by the base adapted to extend into the central opening of the tire for engaging the tire beads; and
    a lower flexible sling carried by the base for engaging and supporting the outer tire surface.

2. The tire rack defined in claim 1 in which the upper support member includes a pair of supports carried by the base; and in which each of the upper supports includes a pivot, an arm extending outwardly from said pivot and a spring biasing said arm about said pivot.

3. The tire rack defined in claim 2 in which each of the pivots has an elongated cylindrical portion adapted to engage the tire beads.

4. The tire rack defined in claim 1 in which the upper support member includes a pair of supports carried by the base; and in which each of the upper supports includes a fixed pin extending generally horizontally with respect to the base, an arm rotatably mounted on the pin and a spring biasing said arm about said pin.

5. The tire rack defined in claim 4 in which each of the arms is rotatably mounted on the pin by a cylindrical collar.

6. The tire rack defined in claim 4 in which each of the arms is generally T-shaped and includes a base bar extending generally normal to the pin and a cross bar extending generally normal to said base bar and generally parallel with the pin.

7. The tire rack defined in claim 4 in which a plurality of said arms are rotatably mounted in a spaced relationship along the fixed pin.

8. The tire rack defined in claim 1 in which the sling is supported with respect to the base by a pair of spring biased cables.

9. The tire rack defined in claim 1 in which the sling is formed of a flexible material.

10. A tire rack for green tires, each green tire having a pair of spaced beads and an outer surface, said tire rack comprising:
   a base;
   a pair of upper support members carried by said base, each of said upper support members including a pair of pivotally mounted T-shaped arms adapted to extend through the central opening of the tire to engage the beads to support the tire;
   a spring engageable with each of the arms for biasing said arms into engagement with the beads; and
   a lower support carried by the base adapted to support the tire from below by engaging the outer surface.

11. The tire rack defined in claim 10 in which the lower support includes a flexible sling adapted to engage the outer surface of the tire.

12. The tire rack defined in claim 11 in which the sling is supported on the base by a pair of spring biased cables.

13. The tire rack defined in claim 12 in which the sling is formed of a flexible fabric.

14. The tire rack defined in claim 10 in which a spring biases each of the arms towards each other; and in which an outer end of each of the arms has a cylindrical configuration for engaging the tire bead.

15. The tire rack defined in claim 10 in which each of the arms is pivotally mounted on a fixed pin extending generally horizontally outwardly with respect to the base.

16. The tire rack defined in claim 15 in which each of the arms includes a base bar extending generally normal to the pin and a cross bar extending generally normal to said base bar and generally parallel with the pin.

17. In combination, a tire rack and at least one green tire, said green tire including an outer surface and a pair of bead rings defining a central opening; said tire rack including a base, upper and lower support members carried by the base for supporting the green tire, said lower support member including a flexible sling which supportingly engages the outer tire surface and said upper support member extending into the central opening of the tire and supportingly engages said bead rings.

18. The combination defined in claim 17 in which a pair of the upper support members are carried by the base; and in which each of the upper support members includes a pivot, an arm extending outwardly from said pivot and a spring biasing said arm about said pivot.

19. The combination defined in claim 18 in which each of the pivots includes an elongated cylindrical portion which supportingly engages the beads; and in which each of the arms includes an outer end which supportingly engages the bead rings circumferentially spaced from the supporting engagement with the cylindrical portions of the pivots.

* * * * *